United States Patent

Irons

[15] 3,697,900

[45] Oct. 10, 1972

[54] ADMITTANCE INVERSION CIRCUITS

[72] Inventor: Fred H. Irons, Allentown, Pa.

[73] Assignee: Cambridge Thermionic Corporation, Cambridge, Mass.

[22] Filed: Dec. 10, 1970

[21] Appl. No.: 96,716

[52] U.S. Cl. .......................333/80, 307/229, 330/69

[51] Int. Cl. ..............................................H01p 1/22

[58] Field of Search ............333/80; 307/229; 330/69

[56] References Cited

UNITED STATES PATENTS

| | | | |
|---|---|---|---|
| 3,562,678 | 2/1971 | Antoniou | 333/80 |
| 3,573,647 | 4/1971 | Antoniou | 333/80 |
| 3,448,411 | 6/1969 | Patterson | 333/80 |
| 3,160,835 | 12/1964 | Christensen | 333/80 |
| 3,051,920 | 8/1962 | Sandberg | 333/80 |
| 2,757,345 | 7/1956 | Bogert | 333/80 |

*Primary Examiner*—Herman Karl Saalbach
*Assistant Examiner*—Saxfield Chatmon, Jr.
*Attorney*—Roberts, Cushman & Grover

[57] ABSTRACT

Electronic circuits containing an admittance element produce at a pair of input terminals an equivalent impedance having an admittance term inversely related to the admittance element. The circuits are suitable for miniaturization techniques, and permit electronically simulated inductances of large values to be created with capacitive elements.

The admittance inverting circuits are of two kinds: one produces an equivalent impedance which appears as a resistance paralleling said inverted admittance; the other has an equivalent impedance which appears as a resistance in series with said inverted admittance. Both circuits have the admittance element connected in circuit with first and second resistances and with isolating amplifier means causing one of the parameters of current or voltage in one of said resistances to appear at the circuit's input terminals. In the circuit having a parallel equivalent impedance, the first resistance is in series with the admittance element, and these two are paralleled by said second resistance. An operational amplifier has the admittance element connected between input and output, so that the circuit's input terminals see the voltage developed across the first resistance. In the circuit producing a series equivalent impedance, the admittance element is paralleled by the second resistance, and the two are in series with the first resistance. Two or more emitter follower amplifiers are connected to cause the current through the second resistance to be the current through the input terminals.

23 Claims, 23 Drawing Figures

INVENTOR
FRED H. IRONS
BY Roberts, Cushman & Grover
ATTYS

ADMITTANCE INVERSION CIRCUITS

BACKGROUND OF THE INVENTION

The field of the present invention relates to electronic circuitry and microminiaturized construction thereof, and involves new circuits capable of admittance inversion for inductance simulation.

Microminiaturization techniques for fabrication of electronic circuits are possible with many, but not all, types of circuits. Circuits employing semiconductor junctions and resistors are simple and economical to make. Circuits with capacitive elements are only slightly more difficult to provide. Inductive elements, however, are not within the repertoire of integrated or microminiaturized circuit techniques except at very high frequencies. The current state of the art is unable in low frequency applications, e.g., sub-audio apperations, to produce inductances of greater magnitude than a few nano-henries. These values are wholly inadequate for many applications, such as the construction of band pass filters and the like where large inductive values are commonplace.

In order to fill the gap in fabrication technique generated by the inability to miniaturize large inductive elements, hybrid techniques which connect conventional inductors to integrated circuits are common. The problem is also avoided by resort to circuits which simply do not have inductive elements, but function in a different manner. Both of these approaches have problems of their own, however, and do not provide a very satisfactory solution to the problem of providing an inductance in integrated thin or thick film or other miniaturized circuitry.

SUMMARY OF THE INVENTION

Objects of the present invention are to provide circuits which invert admittance, e.g., to simulate an inductance, and which utilize elements capable of construction with microminiaturization techniques, which are reliable, versatile, and useful in a wide variety of applications.

Circuits according to the invention are of a type which have a pair of input terminals defining input parameters of current and voltage, and include an admittance element, such as a capacitor, utilized in such a way that the impedance of the circuit seen at the input terminals has an admittance portion which is inversely related to the admittance element in the circuit. If the admittance element is capacitive, the inversely related admittance portion will be inductive. In the circuit, the admittance element is connected to first and second resistance means so that one of the parameters of current and voltage of one of the resistance means is related to the opposite parameter of current and voltage appearing at the input terminals to produce an equivalent impedance with the admittance inversion term appearing therein, and amplifier means are provided for isolating the parameter giving rise to the equivalent impedance and causing this parameter to appear at the input terminals, thereby causing said equivalent impedance to appear at said input terminals.

In one practical embodiment, the admittance element is in series with the first resistance means and both are paralleled by the second resistance means. An operational amplifier is connected with the admittance element between its input and output so that the voltage developed across the first resistance means appears at the input terminals. The equivalent impedance seen at the input terminals takes the form of an admittance term in parallel with a resistance term and the admittance term is inversely related to the admittance element.

In another practical embodiment, the capacitive admittance element is connected in parallel with the second resistance means, and both are in series with the first resistance means. Emitter follower amplifier means are used to isolate the capacitive admittance element and first resistance means from the input terminals, and to cause the current flowing into the input terminals to be the current flowing through the second resistance means. The equivalent impedance at the input terminals takes the form of an inductive admittance term in series with a resistance term, and the inductive admittance term is inversely related to the capacitive admittance element.

These and other objects and novel aspects of the invention will be apparent from the following description of preferred embodiments thereof.

DESCRIPTION OF THE PREFERRED EMBODIMENTS

The present invention can be conveniently separated into two circuit types. One type simulates an impedance with a resistive branch paralleling the inverted admittance branch (parallel simulation); the other type simulates an impedance with a resistive part in series with the inverted admittance part (series simulation). Although the two circuit types are united by common features of construction, and a common underlying concept, it facilitates description to take them up separately, describing their derivation, basic configurations, analysis, and practical versions independently.

PARALLEL SIMULATION

Figure 1:
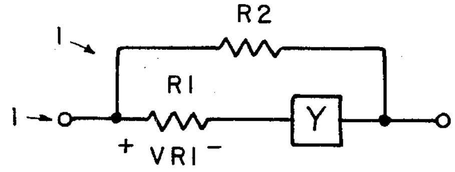
FIGS. 1, 2 and 3 are schematic diagrams illustrating a derivation of one embodiment of the present invention.

FIG. 1 illustrates a network 1 having an admittance element Y connected in series with a fist resistance R1, the two being paralleled by a second resistance R2. A current I flows through the network. The admittance element Y is general, an arbitrary function of an imaginary component of susceptance $jB$ and a real component of conductance G, and can be resistive, capacitive, inductive, or a composite, or a short or open circuit: for analytical purposes, however, it is convenient to call this element an admittance.

In the circuit of FIG. 1, the voltage across resistance R1, denoted VR1, is related to the input current I by the expression $$VR1 = I\,\frac{1}{\dfrac{1}{\dfrac{R1R2}{R1+R2}} + \dfrac{1}{R1R2Y}} \quad (1)$$

Defining $Zeq$ as $$Zeq = VR1/I \quad (2)$$

It follows that $$Zeq = \frac{1}{\dfrac{1}{Req} + Yeq}, \text{ where} \quad (3)$$

$$Req = \frac{R1R2}{R1+R2}, \text{ and} \quad (4)$$

$$Yeq = \frac{1}{R1R2Y} \quad (5)$$

Figure 2:
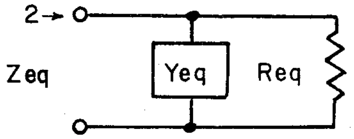

The impedance $Zeq$ is thus in the form of an equivalent resistance Req paralleled by an equivalent admittance $Yeq$ which is inversely related to the admittance Y. FIG. 2 illustrates an equivalent circuit 2 for $Zeq$.

Figure 3:
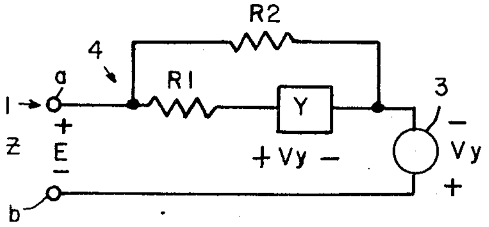

The equivalent impedance $Zeq$, constructed analytically above, cannot be realized at any pair of terminals in the circuit 1 of FIG. 1. This impedance, which has the desired admittance inversion characteristic, can be realized at a pair of input terminals, however, by adding to the network 1 of FIG. 1 a series voltage source 3 of voltage $-Vy$ to cancel the voltage $Vy$ appearing across the admittance Y. Such a circuit 4 is shown in FIG. 3, which has input terminals $a,b$ defining input parameters of voltage E, current I, and impedance $Z = E/I$. Connected between input terminals $a,b$ are the network 1 of FIG. 1 with resistances R1 and R2 and admittance element Y, and the negative voltage source 3 of voltage $-Vy$. It can be readily seen that $E = VR1$ and that $Z =$ Zeq. Therefore, if a circuit having the characteristics of the circuit 4 of FIG. 3 can be physically realized, the goal of producing an admittance inverting circuit will be attained.

Figure 4:
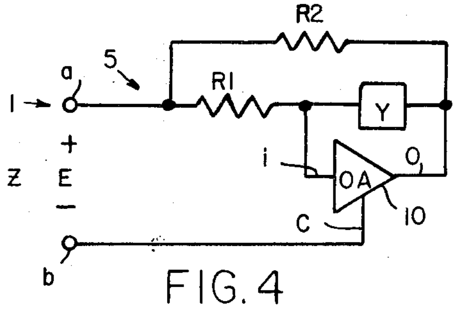
FIG. 4 is a schematic diagram of this embodiment.

FIG. 4 illustrates schematically a physically realizable circuit 5 which substantially duplicates the characteristics of the circuit 4 of FIG. 3. This circuit, which has input terminals $a,b$ with parameters E, I, and Z, resistances R1 and R2 and admittance Y, as before, employs an operational amplifier 10 to provide the negative voltage source $-V_y$. The operational amplifier 10, as shown, has the admittance element Y connected between its input terminal $i$ and output terminal $o$, with its common terminal $c$ connected to terminal $b$. If one were to assume that the operational amplifier 10 were ideal, with infinite input resistances, zero output resistance, and an infinite open circuit voltage gain, then its input voltage (between terminals $i$ and $b$) would be zero, its input current (into terminal $i$) would be zero, and its output voltage (between terminals $o$ and $b$) would be $-V_y$. An ideal operational amplifier 10 would thus exactly duplicate the circuit 4 of FIG. 3 and exactly yield the predicted impedance relationship.

Figure 5:
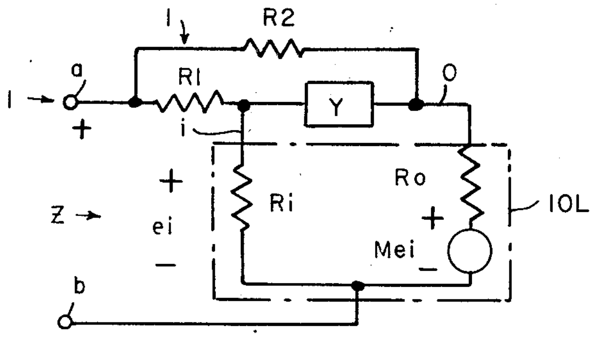
FIGS. 5 and 6 are equivalent circuits of the embodiment of FIG. 4.

Deviations of the operational amplifier 10 from the ideal can be assessed with the aid of FIG. 5, which shows the operational amplifier 10 substituted by its linear equivalent 10L with input resistance R$i$, output resistance R$o$ and a finite voltage gain M represented by a voltage source of $Me_i$ volts where $e_i$ is the amplifier input voltage (between terminals $i$ and $b$). Conventional circuit analysis shows that $$Z = \frac{(R2+Ri)(R1+Ro) + [R1R2(Ri+Ro+MRi) + RoRi(R1+R2)]Y}{[(R1+R2+Ri+Ro+MRi) + (Ri+Ro+MRi)(R1+R2)Y]} \quad (6)$$

Whenever R$i$ + R$o$+ MR$i$ is large compared to the other terms in the expression, as it typically will be since both M and R$i$ are large for an operational amplifier, then the expression can be approximated by $$Z = \frac{R1R2Y}{[1+(R1+R2)Y]} = Zeq \quad (7)$$

Figure 6:
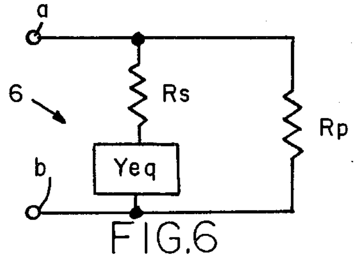

A somewhat more accurate approximation is achieved by assuming that R$i$ is large compared to R1 and R$o$ is small compared to R2. Without repeating the lengthy analysis, this approximation yields an equivalent circuit 6, shown in FIG. 6, which provides a series resistance R$s$ in series with equivalent admittance Yeq, both paralleled by parallel resistance R$p$. These elements are given by $$Yeq = 1/R1R2Y \quad (8)$$

$$Rp = R1R2/(R1+R2) \quad (9)$$

$$Rs = R1/M \quad (10)$$

Since R1 and M are typically of the same order of magnitude, Rs is seldom of more than a few ohms in magnitude, and the approximation in Equation (7) is usually accurate enough for most purposes, especially where Rs is insignificant compared to Yeq at the frequency of interest.

Figures 7, 8:
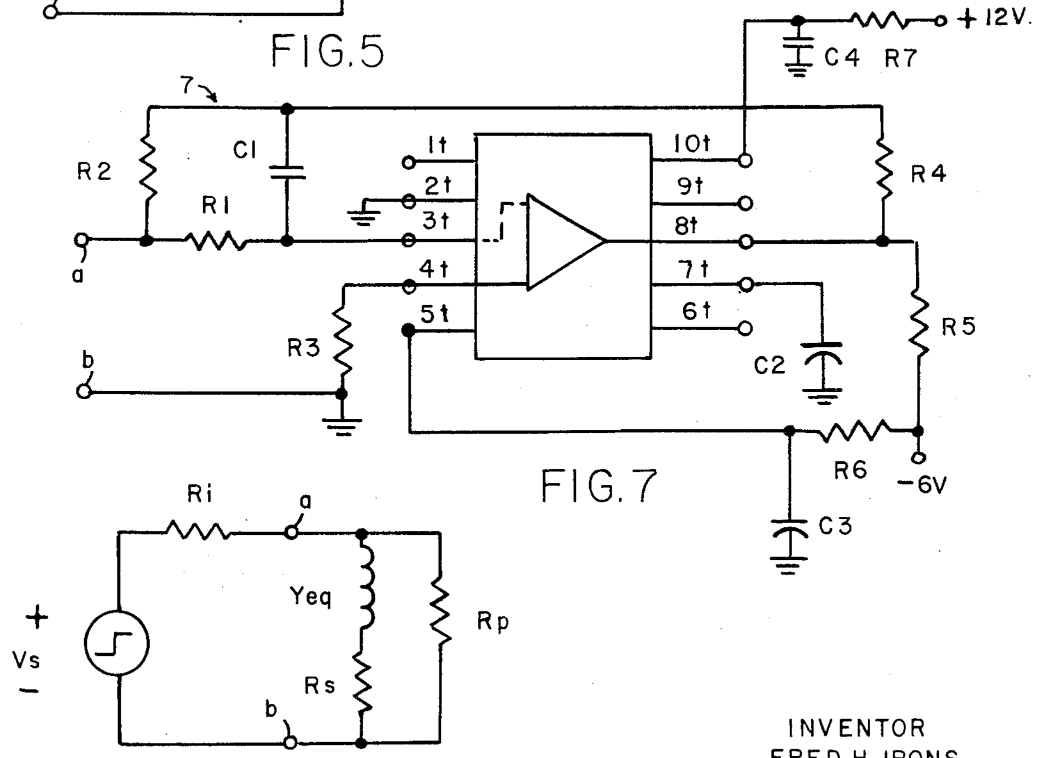
FIG. 7 is a equivalent diagram of a practical version of the embodiment of FIG. 4.
FIG. 8 is an equivalent circuit of the version of FIG. 7.

FIG. 7 illustrates connection details of a practical version of the operational amplifier circuit 5 of FIG. 4. Connections to the operational amplifier 10 are to the numbered terminals of the particular manufacturer's embodiment, the numerals 1t through 10$t$ on the terminals corresponding to the manufacturer's numbers 1 through 10. The interconnections of the elements are clearly shown in the drawing with standard d-c voltage sources omitted but their connection indicated by the symbols +12V and −6V where applicable. For a more complete disclosure of the circuit elements whose connections are shown in FIG. 7, the following list identifies structural characteristics, ratings, or dimensions so far as material for proper operation of the device, it being understood that routine adjustments and correlations from nominal values may be found necessary for proper performance:

| | |
|---|---|
| Operational Amplifier 10 | Fairchild Model μA702, with a gain of approximately 2,500 |
| R1, R2 | 11.3Kohms |
| C1 | 0.01 microfarads |
| R3 | 13.3Kohms |
| R4 | 100 ohms |

| | |
|---|---|
| R5 | 2.2Kohms |
| R6,R7 | 180 ohms |
| C2 | 0.05 microfarads |
| C3, C4 | 0.01 microfarads |

The circuit 7 illustrated in FIG. 7 was tested by exciting it with a 4 volt step voltage source V*s* applied at terminals *a,b*, the source voltage having an internal impedance R*i* of 11.3Kohms. FIG. 8 shows the circuit replaced by its equivalents Y*eq*, R*s*, and R*p*, and connected to the step voltage source. The voltage response at terminals *a,b* was observed on an oscilloscope, and the observed peak voltage, ultimate decayed voltage, and time for the waveform to decay to halfway between its peak and ultimate decayed value were recorded, and correlated to provide experimentally observed results for R*s*, R*p*, and Y*eq*, as shown in FIG. 8. The theoretical values were computed according to Equations (8), (9) and (10). Theoretical and observed values are given in the table below. Agreement of these values is within expected observational and measurement error.

| | Theoretical | Observed |
|---|---|---|
| Rp | 5.56Kohms | 5.57Kohms |
| Rs | 4.52 ohms | 0 ohms |
| Yeq | 1.28 Henries | 1.29 Henries |

A further test was performed on a similar circuit in which capacitor Cl had a value of 1 microfarad, and resistors R1 and R2 had values of 10K ohms each, which yields an expected theoretical value for Y*eq* of 100 Henries, and the observed value was 108 Henries. Other tests with operational amplifiers have shown correspondence between theory and practice to be at least this good or better.

Figure 9A:
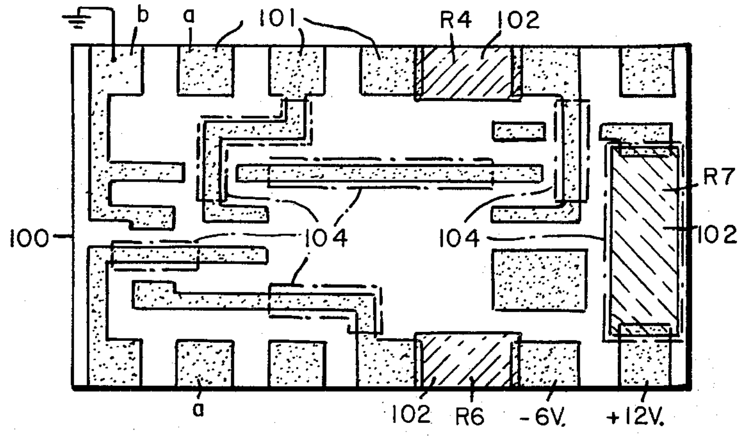
FIGS. 9A through 9E are views of a practical thick film construction of the version of FIG. 7.
Figure 9B:
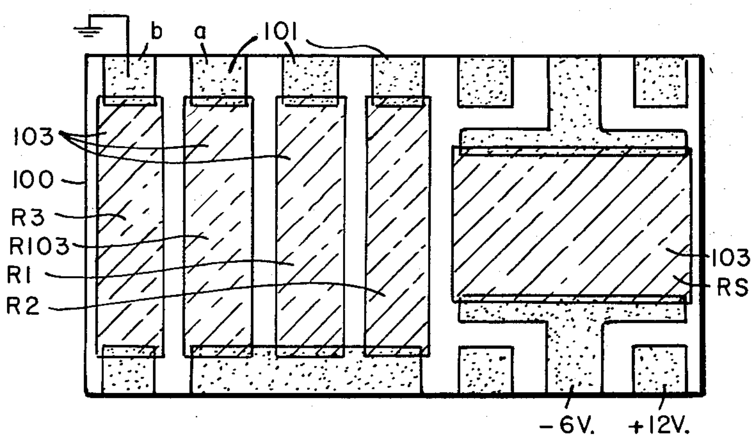

As an example of how the operational amplifier circuit 7 of FIG. 7 can be miniaturized, FIGS. 9A through 9E illustrate a particular practical example of a thick film construction of such a circuit. FIGS. 9A and 9B show the top and bottom surfaces, respectively, of a Centralab substrate 100 made of a material comprising 95 percent Alumina, with dimensions 0.7 inch × 0.4 inch ×0.25 inch. Conductive, resistive, and glazed areas are furnished on the top and bottom substrate surfaces using screen printing techniques to obtain the patterns shown in FIGS. 9A and 9B. For convenience in representation, the patterns shown in FIG. 9B for the bottom surface are shown in mirror image, so that edge contacts on top and bottom surfaces have the same location.

The sequence of steps followed in obtaining the patterns of FIGS. 9A and 9B is as follows: First, the top and bottom conductive areas 101 (shown as stippled areas in FIGS. 9A and 9B) are applied through 165 mesh screen using, e.g., DuPont 7553 Platinum-Gold Conductor Paste. Second, the conductor paste is fired at 870–1,000° C. Third, the top surface has resistive areas 102 (shown as areas of diagonal cross-hatching in FIG. 9A) applied through 165 mesh screen using 100 ohms per square Byrox Paste, thereby to supply resistors R4 (110 ohms), and R6 and R7 (each 180 ohms). Fourth, the resistive paste is fired. Fifth, the bottom substrate surface has applied thereto resistive areas 103 (shown as diagonally hatched areas in FIG. 9B) using a 165 mesh screen and DuPont 7823 Resistive Paste of approximately 500–1,000 ohms per square. So formed are resistors R1 and R2 (11.3Kohms), resistors R3 (13.3 Kohms), resistor R5 (2.2Kohms), and an additional series input resistor R103 of 11.3Kohms. This resistive paste is fired. Finally, a glaze, such as DuPont 8185 Glaze, is applied to crossovers and other required areas 104 shown enclosed within dashed lines in FIG. 9A. After the glaze has been fired, the resistors are trimmed or adjusted, and the substrate is ready for attachment of leads 105, the capacitive components C1 through C4, and the operational amplifier 10.

Figure 9D:
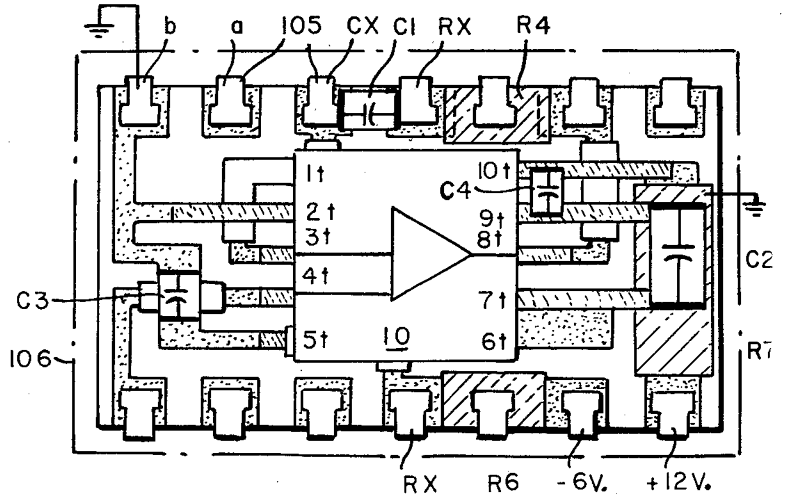
Figure 9C:
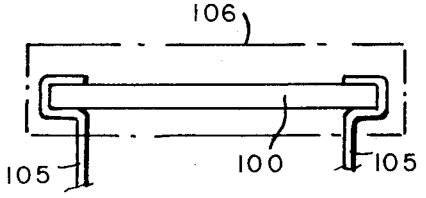
Figure 9E:
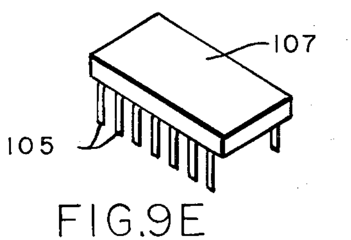

After the substrate has been prepared to the extent shown in FIGS. 9A and 9B, the leads 105 are attached as shown in FIGS. 9C and 9D. Preformed, pretinned leads 105 are secured to the substrate by holding them in place with Teflon tweezers, and then successively dipping them in Kester 1571 flux, and in solder, thereby solder coating the conductive areas of the circuit and soldering the leads 105 to the substrate. To apply the operational amplifier 10 and the capacitors C1–C4, the operational amplifier first has its leads trimmed as shown in FIG. 9D, the leads being shown as the solid areas extending sidewise from the terminal marks 1*t* through 10*t* of operational amplifier 10. As illustrated, the leads from terminals 1*t* and 6*t* are cut off completely; the leads from terminals 2*t*, 7*t*, 9*t*, and 10*t* are relatively long and the remaining leads are somewhat shorter. For the operational amplifier 10, the Fairchild 702 Commercial Model, in ¼ inch × ¼ inch Flat Pack, is used. For capacitors C1, C3, and C4, Vitromon Models VJ0805X103 are used, while for capacitor C2 Vitromon Model VJ1808X473 is used. The operational amplifier 10 and capacitors C1–C4 are placed on the substrate in the positions shown in FIG. 9D and the solder on the substrate is reflowed by heating to approximately 500°F, a soldering iron and additional solder being supplied when necessary. The assembled circuit is then rinsed in trichloroethylene and dried, followed by testing for operation. The entire circuit and portions of the leads 105 are then cast in epoxy to a dimension of approximately 0.75 inch × 0.5 inch × 0.125 inch, as shown by the outer dashed lines 106 in FIGS. 9C and 9D using, for example, Emerson & Cuming 2651 epoxy with catalyst II. The resulting thick film circuit 107 is shown in FIG. 9E. Appropriate external connections to the circuit have been indicated where appropriate in FIGS. 9A through 9E so that correspondence with the schematic of FIG. 7 can be followed easily. At the leads marked C*x*, an external capacitor can be connected to parallel C1 and thus change the inductance value of the circuit; similarly an external resistor connected across leads marked R*x* will change the value of inductance by changing the value of resistor R2.

SERIES SIMULATION

Figure 10:
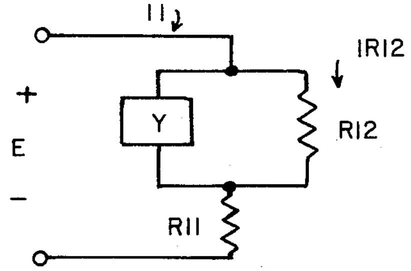
FIGS. 10–15 are schematic diagrams illustrating the derivation of a second embodiment of the invention.

FIG. 10 illustrates a network 11 comprising a first resistance R11 in series with the parallel combination of a second resistance R12 and an admittance element Y, the network having a voltage E. The current IR12 through the resistance R12 is related to the voltage E by the expression $$IR12 = E/(R11R12Y + R11 + R12) \quad (11)$$

If we define an equivalent impedance Z*eq* as $$Zeg = E/IR12 \quad (12)$$

then $$Zeq = R11R12Y + (R11 + R12) = 1/Yeq + Req, \quad (13)$$

where $$Yeq = 1/R11R12Y, \text{ and} \quad (14)$$

$$Req = (R11 + R12) \quad (15)$$

Figure 11:
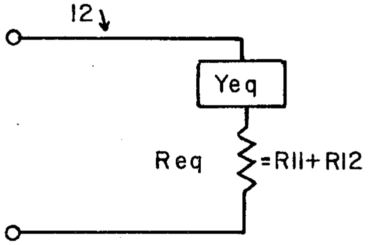

The equivalent impedance thus looks like a resistance in series with an admittance which is inversely related to the admittance element of the network. FIG. 11 illustrates such an equivalent circuit 12, which has the desired characteristic of admittance inversion. The equivalent impedance $Zeq$, however, is not attainable at any terminal pair in the circuit 11 of FIG. 10, since it is merely an analytically fabricated expression.

Figure 12:
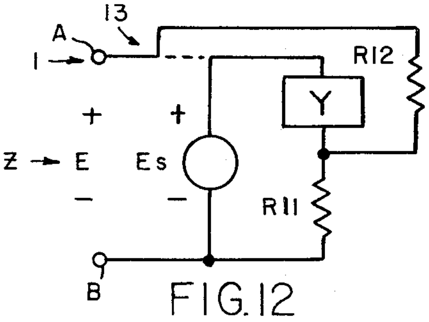

FIG. 12 illustrates a circuit 13 which enables the equivalent impedance Zeq to be obtained at the input terminals A,B of the circuit. The necessary isolation of current IR 12 throughout the input terminals A,B is accomplished by providing a separate voltage source $Es$, generating the input voltage E, in series with the admittance element Y and resistance R11. Visual analysis of this circuit 13 shows that $I = IR12$ and that therefore the input impedance Z of the circuit given by $Z = E/I$ is the same as $Zeq$, and the circuit 13 of FIG. 12 is represented by the equivalent circuit 12 of FIG. 11, containing the inverted admittance term in series with a resistance term.

Figure 13:
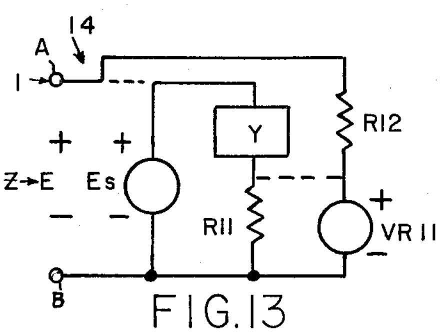
Figure 14:
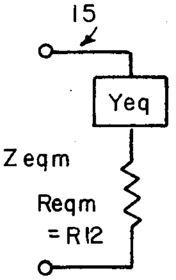

FIG. 13 shows a modification 14 of the circuit 13 of FIG. 12 in which the value of the equivalent resistance in series with the inverted admittance in the equivalent circuit is reduced. In the modified circuit 14, a voltage source VR11 is placed in series with resistance R12 in place of the resistance R11. The voltage source has the same voltage as that appearing across resistance R11, and thus behavior of the circuit is similar to behavior of the circuit of FIG. 12. It can be easily shown that the modified circuit 14 of FIG. 13 can be represented by an equivalent circuit 15, shown in FIG. 14, which has a modified input impedance $Zeqm$ given by $$Zeqm = 1/R11R12Y + R12 = 1/Yeq + Reqm \quad (16)$$

The series equivalent resistance $Reqm$ is thus reduced from (R11 + R12) to R12 by the modification of FIG. 13.

Figure 15:
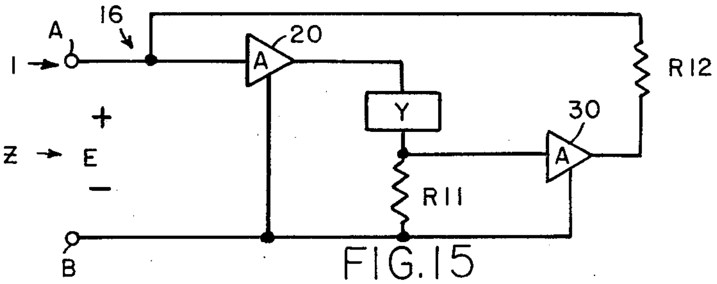

The voltage sources E$s$ and VR11 employed in FIG. 13 can be substantially realized in practice by using high input impedance, unit gain amplifiers 20 and 30 as shown in the circuit 16 of FIG. 15. As shown, amplifier 20 is connected so that the voltage E at the input terminals A,B is across the amplifier input, and its output voltage appears in series with the admittance element Y and the resistance R11. Similarly, amplifier 30 is connected so that its input is across resistance R11 and its output is in series with resistance R12. If the amplifiers 20 and 30 are assumed to have infinite input impedance, zero output impedance, and unit voltage gain, their equivalent circuit is given exactly by the circuit 14 of FIG. 13 and hence it requires no further analysis to show that with these assumptions of ideality, the circuit 16 of FIG. 15 has an impedance Z which is the same as the $Zeqm$ of FIG. 14, and that the circuit 16 can be represented by the circuit 15 of FIG. 14.

Figures 16, 17:
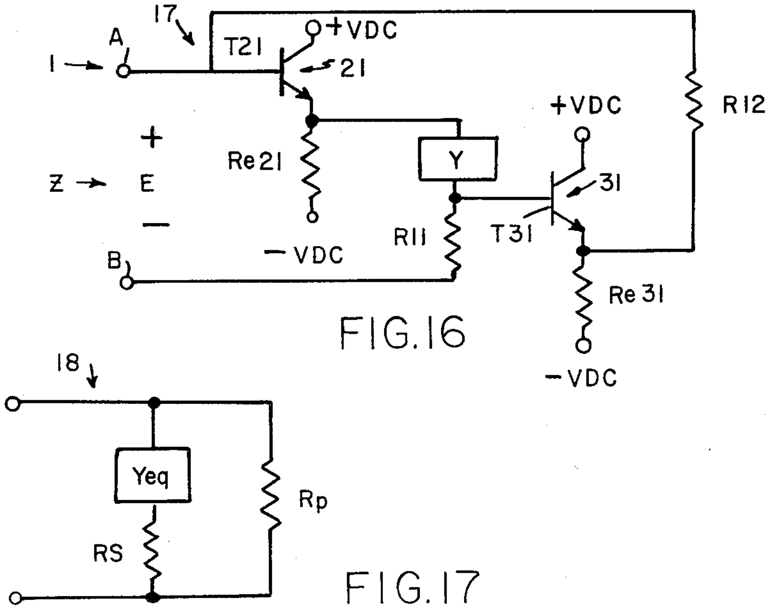
FIG. 16 is a schematic diagram of the second embodiment.
FIG. 17 is an equivalent circuit of the embodiment of FIG. 16.

FIG. 16 illustrates a practical version 17 of the circuit 16 of FIG. 15 in which emitter follower amplifiers 21 and 31 are substituted for the amplifiers 20 and 30, respectively. As shown, the emitter follower amplifier 21 comprises a transistor T21 having its base connected to terminal A, its emitter connected to the admittance element Y, with an emitter resistance Re21 connected to a biasing voltage $-Vdc$, and with its collector connected to another biasing voltage $+Vdc$. Emitter follower amplifier 31 similarly comprises transistor T31 with its base connected to the junction of admittance element Y and resistance R11, its collector connected to bias voltage $+Vdc$, its emitter connected to resistance R12 and through an emitter resistor Re31 to a bias voltage $-Vdc$.

The emitter follower amplifies 21 and 31, of course, do not have unity voltage gain, but rather a voltage gain $\alpha$ which is related to the transistor current gain $\beta$ by the expression $$\alpha = \frac{\beta}{\beta + 1} = \left(1 - \frac{1}{\beta}\right) \text{ for } \beta >> 1 \quad (17)$$

Thus for transistors with large current gains, the voltage gain approaches unity. Taking into account the actual voltage gains $\alpha 21$ and $\alpha 31$ of the amplifiers 21 and 31, respectively, the input impedance Z of the circuit 17 of FIG. 16 is given by $$Z = \frac{R11R12Y + R12}{(1 - \alpha 21\alpha 31)R11Y + 1} \quad (18)$$

This is an impedance which can be represented by the equivalent circuit 18 of FIG. 17, which looks like an admittance Y$eq$ connected in series with a series resistance R$s$, the two being paralleled by a parallel resistance R$p$. Comparing FIG. 17 to Equation (18) gives:

$$Yeq = 1/R11R12Y \quad (19)$$

$$Rs = R12/(\alpha 21\alpha 31) \quad (20)$$

$$Rp = R12/(1 - \alpha 21\alpha 31) \quad (21)$$

The admittance Y$eq$ continues to bear the desired inversion property, the series resistance R$s$ is the same as in the ideal case, and the parallel resistance R$p$ will be very high if the voltage gains are close to unity. For example, if each transistor has a current gain $\beta$ of 100, then R$p$ is approximately 50 times as large as R12 or R$s$. In many cases R$p$ can be substituted with an open circuit with reasonable accuracy.

Figure 18:
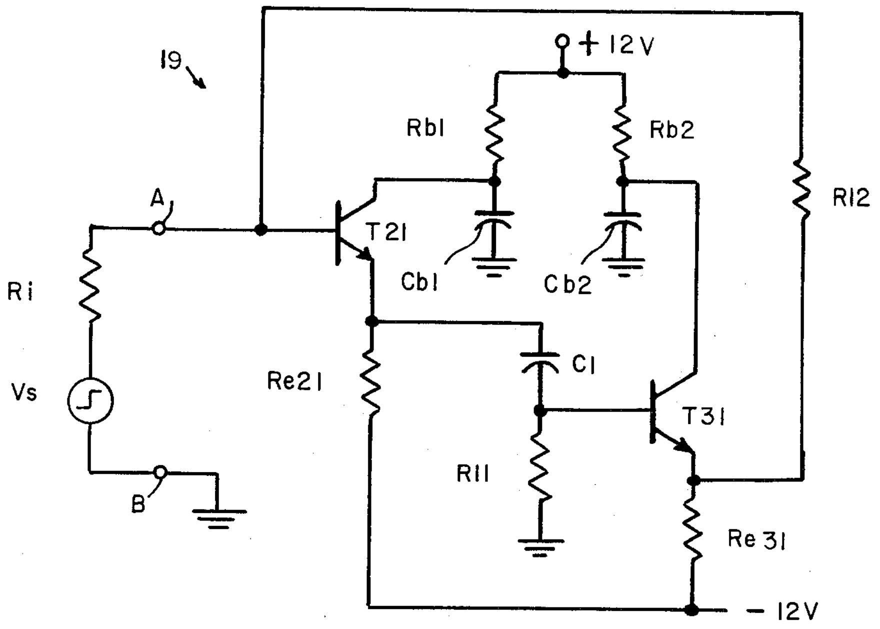
FIGS. 18 and 19 are practical versions of the embodiment of FIG. 16.

FIG. 18 illustrates a practical embodiment 19 of the circuit 17 shown in FIG. 16. This circuit shows details of connection of the bias voltages of +12 volts and −12 volts as indicated, and further shows a test source voltage V$s$ with internal resistance R$i$ connected to the terminals A,B for testing purposes. The connections of the various elements are clearly shown in FIG. 18 which is to that extent self-explanatory. For a more complete disclosure of the circuit elements whose connections are shown in FIG. 18, the following list identifies structural characteristics, ratings, or dimensions so far as material for proper operation of the device, it being understood that routine adjustments and correlations from nominal values may be found necessary for proper performance.

| | |
|---|---|
| T21, T31 | Type 2N3827 |
| R11 | 100Kohms |
| Re21, Re31 | 2.2Kohms |
| Rb1, Rb2 | 200 ohms |
| Cb1, Cb2 | 0.01 microfarads |
| Vs | 4 volts step voltage |
| Ri | 10Kohms |
| R12 | Trial 1: 100 ohms ± 5%<br>Trial 2: 1000 ohms ± 10% |

The circuit described above was tested with resistance R12 first at 100 ohms and then at 1,000 ohms using the source voltage indicated in the drawing. By observing waveforms at terminals A,B on an oscilloscope and reading values from the oscilloscope screen of initial and final voltage values and time for decay halfway between, measured inductances for the circuit were observed to be 8.6 Henries and 81 Henries, respectively, compared to theoretically predicted values of 10 Henries and 100 Henries, respectively, the correspondence between observed and predicted values falling within the range of expected observational error and component value uncertainty.

Figure 19:
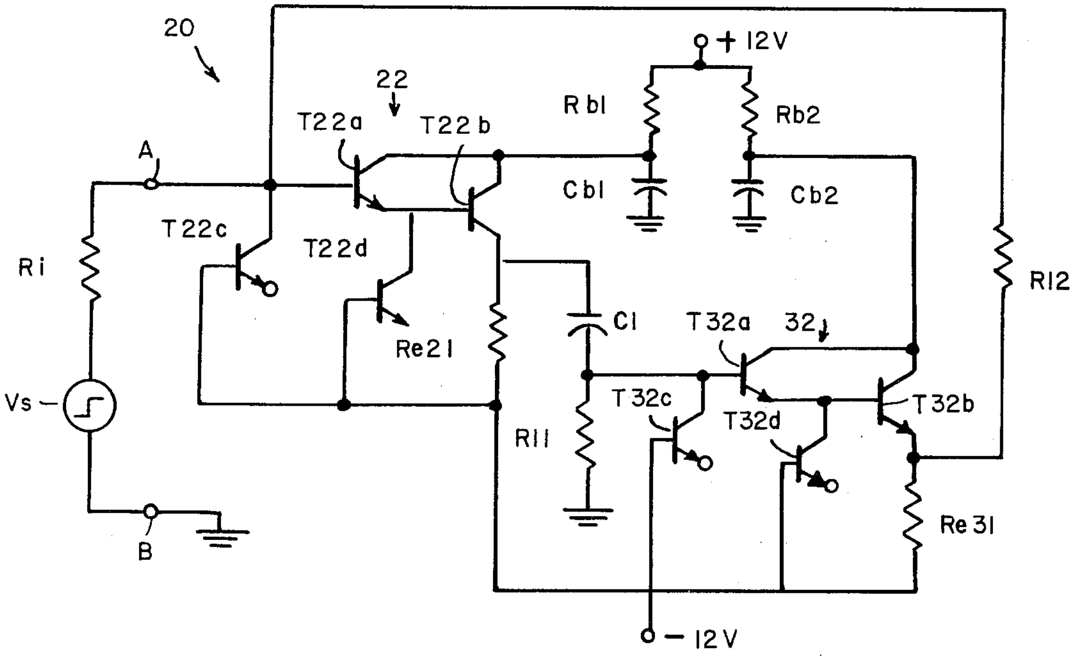

In order to obtain higher gain, it is possible to use a composite amplifier in place of the emitter follower amplifier of FIG. 16. FIG. 19 illustrates such a circuit 20, which employs Darlington composite amplifiers 22 and 32 comprising transistors T22*a*, T22*b*, T22*c*, and T22*d* in amplifier 32, the transistors being connected as shown. For large gain transistors, the gain of the composite amplifier is approximately the product of the individual gain of the transistors T22*a* and T22*b* for amplifier 22, the transistors T32*a* and T32*b* for amplifier 32. Thus if the individual transistor current gains are 100, the composite gain will be 10,000, and Rp will be approximately 5,000 times as large as R12. A circuit 20 according to FIG. 19 was constructed with components having the values given in the table above for FIG. 18, the composite amplifiers 22 and 32 having all transistors of Type 2N3827. Tests with R12 at 100 and 1,000 ohms, respectively, yielded observed inductances of 11 and 80 Henries, respectively, compared with anticipated theoretical values of 10 and 100 Henries, respectively. This agreement was within expected observational error. Values for R*s* and R*p* were similarly within expected observational error margins.

To summarize the features of both the parallel and series simulation circuits described above, both are capable of converting a capacitance to an effective inductance, and the manner of admittance inversion is one susceptible to fabrication using microminiaturization techniques. The value of the inductance (or other admittance) so obtained, is proportional to the admittance element and also to the two resistances R1 and R2 or R11 and R12. Since it is a simple matter to provide variable resistances, the inductance obtainable is easily varied or given an arbitrary value. Both parallel and series simulation, in practical, physically obtainable circuits, have an element of parallel resistance which can be cancelled if necessary with a parallel negative resistance obtainable from tunnel diodes, varactors, or other similar devices. Wide ranges of inductance are obtainable without deviating significantly from the analysis given above; values of inductance in excess of 1,000 Henries are obtainable.

It should be understood that the present disclosure is for the purpose of illustration, and that the invention includes all modifications which fall within the scope of the appended claims.

What is claimed is:

1. An admittance inverting circuit comprising a pair of input terminals defining input parameters of current and voltage;

an admittance element;

first and second resistance means forming a circuit with said admittance element and input terminals, one of said resistance means relating one of its parameters of voltage and current to the opposite of said input parameters to develop a simulated impedance a portion of which is an equivalent admittance which is inversely related to and has the same polarity as said admittance element; and amplifier means for isolating said one resistance means to place its said one parameter at said input terminals, whereby said admittance term inversely related to said admittance element appears at said input terminals.

2. An admittance inverting circuit according to claim 1 wherein said first resistance means is in series with said admittance element, and said second resistance means parallels said series combination of first resistance means and admittance element, said first resistance means relating its voltage parameter to said input current parameter to develop said simulated impedance.

3. An admittance inverting circuit according to claim 2 wherein said simulated impedance has an admittance term which is inversely related to the product of said first and second resistance means and said admittance element.

4. An admittance inverting circuit according to claim 2 wherein said simulated impedance is substantially in the form of a resistance paralleling the admittance portion of said simulated impedance.

5. An admittance inverting circuit according to claim 4 wherein said simulated impedance further comprises another resistance in series with the admittance portion of said simulated impedance.

6. An admittance inverting circuit according to claim 2 wherein said amplifier means substantially cancels the voltage of said admittance element, and wherein the voltage of said first resistance means appears at said input terminals.

7. An admittance inverting circuit according to claim 6 wherein said amplifier means comprises an amplifier with high input impedance and high gain, said admittance element being connected between the input and output of said amplifier.

8. An admittance inverting circuit according to claim 7 wherein said amplifier is an operational amplifier connected with its input between an input terminal and the junction of said first resistance means and said admittance element, and its output between said input terminal and the junction between said second resistance means and said admittance element.

9. An admittance inverting circuit according to claim 8 wherein said operational amplifier has input impedance R*i* , output impedance R*o*, and open circuit voltage gain M, and wherein said simulated impedance (Z) relates these parameters to the first resistance means (R1), second resistance means (R2), and admittance element (Y) substantially according to the expression $$Z=\frac{(R2+Ri)(R1+Ro)+[R1R2(Ri+Ro+MRi)+RoRi(R1+R2)]Y}{[(R1+R2+Ri+Ro+MRi)+(Ri+Ro+MRi)(R1+R2)Y]}$$

10. An admittance inverting circuit according to claim 9 wherein said admittance element is a capacitor, whereby said admittance term is inductive.

11. An admittance inverting circuit according to claim 1 wherein said first resistance means is in series with both said admittance element and said second resistance means, which are connected in parallel, and wherein said second resistance means relates its current parameter to said input voltage parameter to develop said simulated impedance.

12. An admittance inverting circuit according to claim 11 wherein said simulated impedance has an admittance term which is inversely related to the product of said first and second resistance means and said admittance element.

13. An admittance inverting circuit according to claim 11 wherein said simulated impedance is substantially in the form of a resistance in series with the admittance portion of said simulated impedance.

14. An admittance inverting circuit according to claim 13 wherein said simulated impedance further comprises another resistance paralleling said series connected admittance portion of said simulated impedance and first resistance.

15. An admittance inverting circuit according to claim 11 wherein said amplifier means substantially impresses an independent voltage equal to the voltage at said input terminals on said admittance element and first resistance means in series therewith, said second resistance means having its current directed to said input terminals.

16. An admittance inverting circuit according to claim 15 wherein said amplifier means comprises an amplifier with high input impedance and substantially unity voltage gain, said input terminals being connected across the amplifier input in said series admittance element and first resistance means being connected across the amplifier output.

17. An admittance inverting circuit according to claim 16 wherein said amplifier is an emitter follower amplifier.

18. An admittance inverting circuit according to claim 16 further comprising a second amplifier separating said second resistance means from said series first resistance means and admittance element, said second amplifier having a high impedance input connected across said first resistance means, a substantially unity voltage gain, and an output in series with said second resistance means.

19. An admittance inverting circuit according to claim 18 wherein said second amplifier is an emitter follower amplifier.

20. An admittance inverting circuit according to claim 19 wherein said first amplifier has a voltage gain $\alpha 1$ and said second amplifier has a voltage gain $\alpha 2$ and wherein said simulated impedance (Z) relates these gain parameters to the first resistance means (R1), second resistance means (R2) and admittance element (Y) substantially according to the expression:

$$Z=\frac{R1R2Y+R2}{(1-\alpha 1\alpha 2)R1Y+1}$$

21. An admittance inverting circuit according to claim 20 wherein said admittance element is a capacitor, whereby said admittance term is inductive.

22. An admittance inverting circuit comprising:

a pair of input terminals defining input parameters of current and voltage;

an admittance element;

first resistance means in series with said admittance element;

second resistance means paralleling said series connected first resistance means and admittance element, one of said input terminals appearing at the junction of said first and second resistance means;

an operational amplifier having its input connected between the other of said input terminals and the junction of first resistance means and admittance element, and having its output connected between said other input terminal and the junction of said admittance element and said second resistance means;

whereby said input parameters of current and voltage are interrelated to produce a simulated impedance a portion of which is an admittance term inversely related to said admittance element connected in parallel with the first resistance means and in series with the second resistance means.

23. An admittance inverting circuit comprising:

a pair of input terminals defining input parameters of current and voltage;

an admittance element;

first resistance means connected in series with said admittance element;

an emitter follower amplifier with its input across said input terminals and its output connected in series with said admittance element and first resistance means;

second resistance means connected to one of said input terminals;

second emitter follower amplifier means connected with its input across said first resistance means and with its output connected in series between said second resistance means and said other input terminal;

whereby said input parameters are interrelated to define a simulated impedance a portion of which is an admittance term which is inversely related to said admittance element, connected in series with a first resistance term and in parallel with a second resistance means.

* * * * *